(12) United States Patent
Massey

(10) Patent No.: US 7,201,519 B2
(45) Date of Patent: Apr. 10, 2007

(54) DIAMOND 2D SCAN FOR ALIGNING AN OPTICAL FIBER TO AN OPTICAL OUTPUT PORT

(75) Inventor: Brian Massey, Marlborough, MA (US)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 11/348,823

(22) Filed: Feb. 7, 2006

(65) Prior Publication Data

US 2006/0133735 A1    Jun. 22, 2006

Related U.S. Application Data

(62) Division of application No. 10/774,023, filed on Feb. 6, 2004, now Pat. No. 7,140,783.

(51) Int. Cl.
G02B 6/42 (2006.01)
G02B 6/36 (2006.01)
G02B 6/00 (2006.01)

(52) U.S. Cl. .......................... 385/90; 385/52
(58) Field of Classification Search ............. None
See application file for complete search history.

(56) References Cited

U.S. PATENT DOCUMENTS

| | | | |
|---|---|---|---|
| 4,008,948 A | 2/1977 | Dalgleish et al. | |
| 4,174,491 A | 11/1979 | Nakamura et al. | |
| RE30,348 E | 7/1980 | Hascoe | |
| 4,663,652 A | 5/1987 | Nishizawa | |
| 4,702,547 A | 10/1987 | Enochs | |
| 4,741,796 A | 5/1988 | Althaus et al. | |
| 4,778,241 A | 10/1988 | Haltenorth | |
| 4,779,788 A | 10/1988 | Rossberg | |
| 4,798,439 A | 1/1989 | Preston | |
| 4,807,956 A | 2/1989 | Tournereau et al. | |
| 5,077,878 A | 1/1992 | Armiento et al. | |
| 5,163,108 A | 11/1992 | Armiento et al. | |
| 5,412,748 A | 5/1995 | Furuyama et al. | |
| 5,559,918 A | 9/1996 | Furuyama et al. | |
| 5,602,955 A | 2/1997 | Haake | |
| 5,623,337 A * | 4/1997 | Iori et al. | 356/153 |
| 5,745,624 A | 4/1998 | Chan et al. | |
| 5,881,198 A | 3/1999 | Haake | |
| 5,896,481 A | 4/1999 | Beranek et al. | |
| 6,146,025 A | 11/2000 | Abbink et al. | |
| 6,164,837 A | 12/2000 | Haake et al. | |

(Continued)

*Primary Examiner*—Sung Pak
(74) *Attorney, Agent, or Firm*—RatnerPrestia

(57) ABSTRACT

A method of aligning an optical fiber to a laser diode obtains first light from the laser at a point designated as the center of a planar geometric shape. Data points are taken at the vertices of the shape, whereby a scan measures alignment quality at each of the vertices and the center. The scan begins by obtaining data at the center and moves to a vertex and the remaining vertices in either a clockwise or counterclockwise fashion. Alignment qualities are compared and the location of highest alignment quality is designated as a new center. The scan repeats until the location of the new center remains unchanged, whereby the new center becomes the point of alignment. Alternately, the scan iteration may repeat with increased resolution by reducing the size of the geometric shape and/or increasing the power from the laser until a point of alignment is found at highest resolution.

3 Claims, 13 Drawing Sheets

U.S. PATENT DOCUMENTS

| | | |
|---|---|---|
| 6,216,939 B1 | 4/2001 | Thackara |
| 6,440,776 B1 | 8/2002 | Musk |
| 6,690,865 B2 * | 2/2004 | Miyazaki ..................... 385/52 |
| 2002/0117604 A1 * | 8/2002 | Volk et al. ............... 250/201.9 |

* cited by examiner

DIAMOND 2D SCAN FOR ALIGNING AN OPTICAL FIBER TO AN OPTICAL OUTPUT PORT

CROSS REFERENCE TO RELATED APPLICATIONS

This application is a divisional of U.S. patent application Ser. No. 10/774,023, filed Feb. 6, 2004 now U.S. Pat. No. 7,140,783, the entire contents of which are hereby incorporated herein by reference.

TECHNICAL FIELD

The present invention relates generally to align and attach systems and, more particularly, to a method of aligning an optical fiber to an optical output port in a planar space.

BACKGROUND OF THE INVENTION

The importance of achieving accurate mutual alignment of individual components in any optical system is well known. The miniature dimensions of components used in modern optical communication systems render such alignment difficult both to achieve and to maintain. For example, one problem in the construction of laser transmitters is that of efficiently coupling the optical output from a laser diode into an optical fiber. To obtain efficient coupling, the fiber end is desirably precisely aligned with the emitting area of the laser. When such alignment is achieved, the fiber is then fixed in place, ideally by a method that ensures alignment is sustained throughout the device lifetime.

The current methods of obtaining an initial alignment between an optical fiber and a laser output port are primarily a raster scan or a spiral scan. An exemplary embodiment of a raster scan is shown in FIG. 1A, and an exemplary embodiment of a spiral scan is shown in FIG. 1B. The scans are characterized by their data points 1–16 and 100–119, respectively, whereby the scan obtains a measure of alignment quality (i.e., coupled optical power) at each data point in the sequence indicated by the arrows. The optical fiber is initially fixed to an X-Y linear movement table and positioned in front of a stationary laser diode output port. The laser diode is activated, and the scan proceeds to activate the linear table, moving the optical fiber along the respective paths indicated in FIGS. 1A–B for raster and spiral scans. At each of the predefined positions 1–16 and 100–119, data is collected about the alignment quality between the optical fiber and the laser output face. A determination is then made as to the location of the predefined position with the highest, or otherwise desirable, alignment quality. A position of final alignment may then be designated at the predefined position with the desired alignment quality.

Such scans are useful for characterizing the input and output ports (i.e., optical fiber face and laser output face), but are generally time consuming in a manufacturing process. For example, a raster scan may be characterized by a 6 micron square with 0.3 micron resolution for an initial low resolution scan, and a 1 micron square with 0.09 micron resolution for a final high resolution scan. Such a scan may require the gathering of 521 data points, whereby each data point may require 100 milliseconds to be processed. In a typical raster scan described above, therefore, approximately 52 seconds may be needed for the complete scan.

It can be seen, therefore, that the large number of data points used in the alignment process typically take an undesirable amount of time to collect and analyze. Furthermore, the final coupling efficiency that is achieved may not always be the highest coupling efficiency that is possible for a particular interface due to an undesirably large number of data points needed for a high resolution scan.

SUMMARY OF THE INVENTION

The present invention is embodied in a method of aligning an input port having a face to an output port having a face. The method includes designating a center data point on the face of the output port, designating at least three perimeter data points disposed around the center data point in a planar geometric configuration at respective predetermined distances from the center data point, obtaining a measure of alignment quality at the center data point and each of the perimeter data points by translating the face of the input port to the center data point each of the perimeter data points, and translating the face of the input port to the data point having a highest measure of alignment quality.

In an alternate embodiment, the method further comprises the steps of designating a new center data point at one of the center and perimeter data points having the highest measure of alignment quality; and iterating the method beginning from the designation of the at least three perimeter data points, where the at least three perimeter data points are now disposed around the new center data point.

In a further embodiment of the present invention, the predetermined distances of the at least three perimeter data points from the center data point are set according to a scan resolution having a current setting. The method is initialized with a scan resolution having a lowest setting, and setting the scan resolution to a higher setting if the new center data point is at the same location as the center data point and if the current setting of the scan resolution is not at a highest setting. In another embodiment, the scan resolution is also changed by setting the scan resolution to an intermediate setting if the current setting of the scan resolution is at the highest setting and if the alignment quality at the center data point falls within an intermediate threshold range; and by setting the scan resolution to the lowest setting if the current setting of the scan resolution is at the highest setting and if the alignment quality at the center data point falls below a lowest threshold. Alternately, there are a plurality of intermediate settings with a corresponding plurality of intermediate threshold ranges.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

Figure 1A:
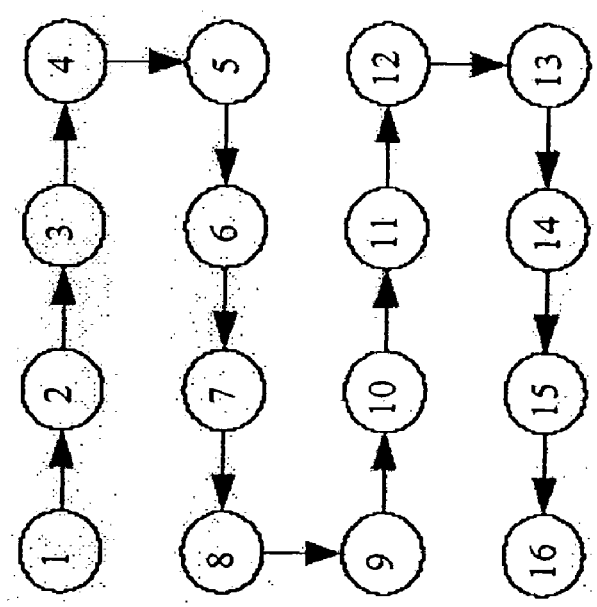
FIG. 1A is a plan view of a typical raster scan as characterized by its data points, according to the prior art.
Figure 1B:
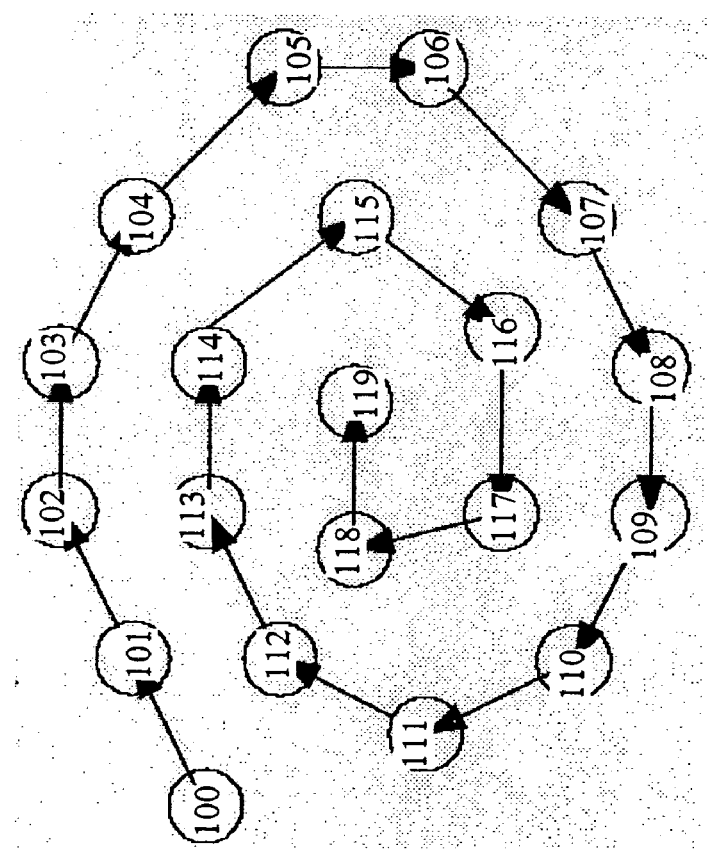
FIG. 1B is a plan view of a typical spiral scan as characterized by its data points, according to the prior art.
Figure 2A:
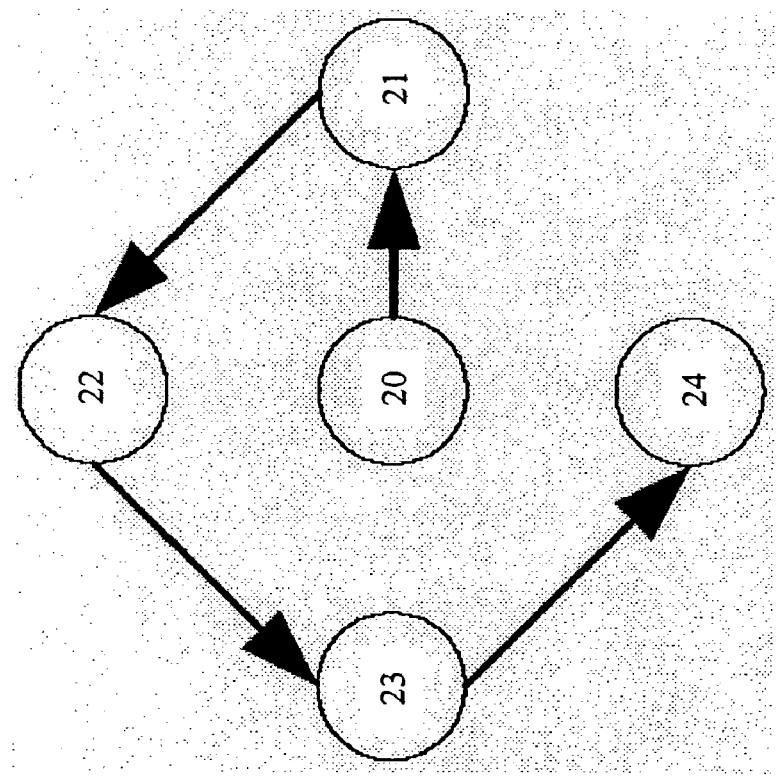
FIG. 2A is a plan view of an exemplary diamond 2D scan as characterized by its data points, according to the present invention.
Figure 2B:
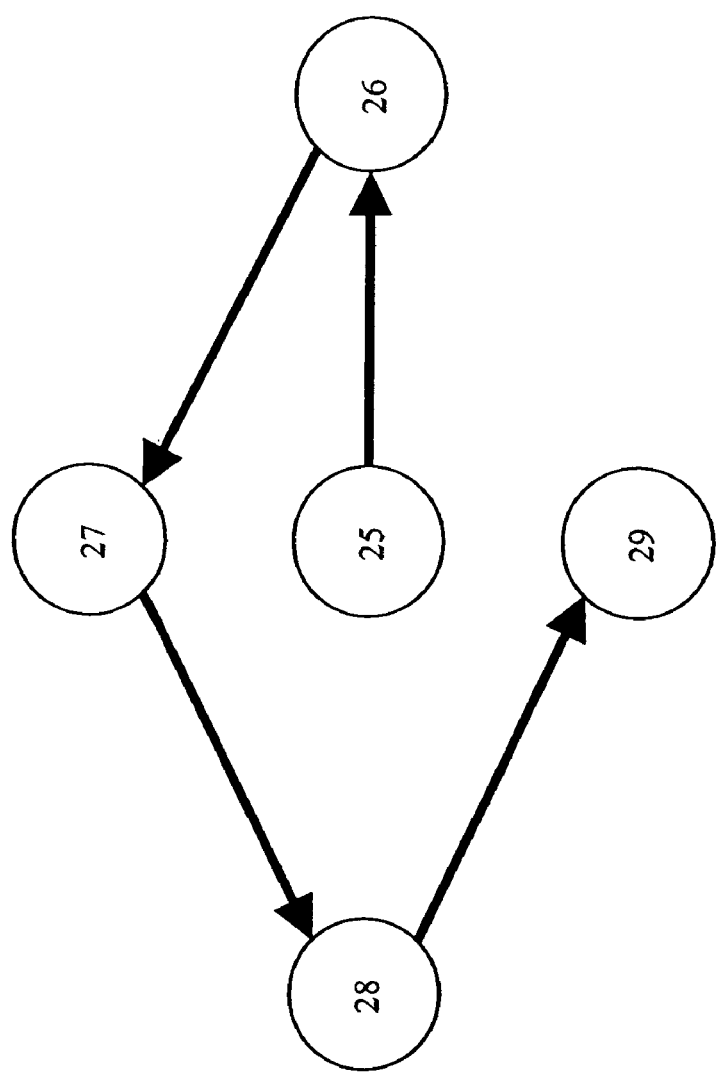
FIG. 2B is a plan view of an alternate exemplary diamond 2D scan as characterized by its data points, according to the present invention.
Figure 3:
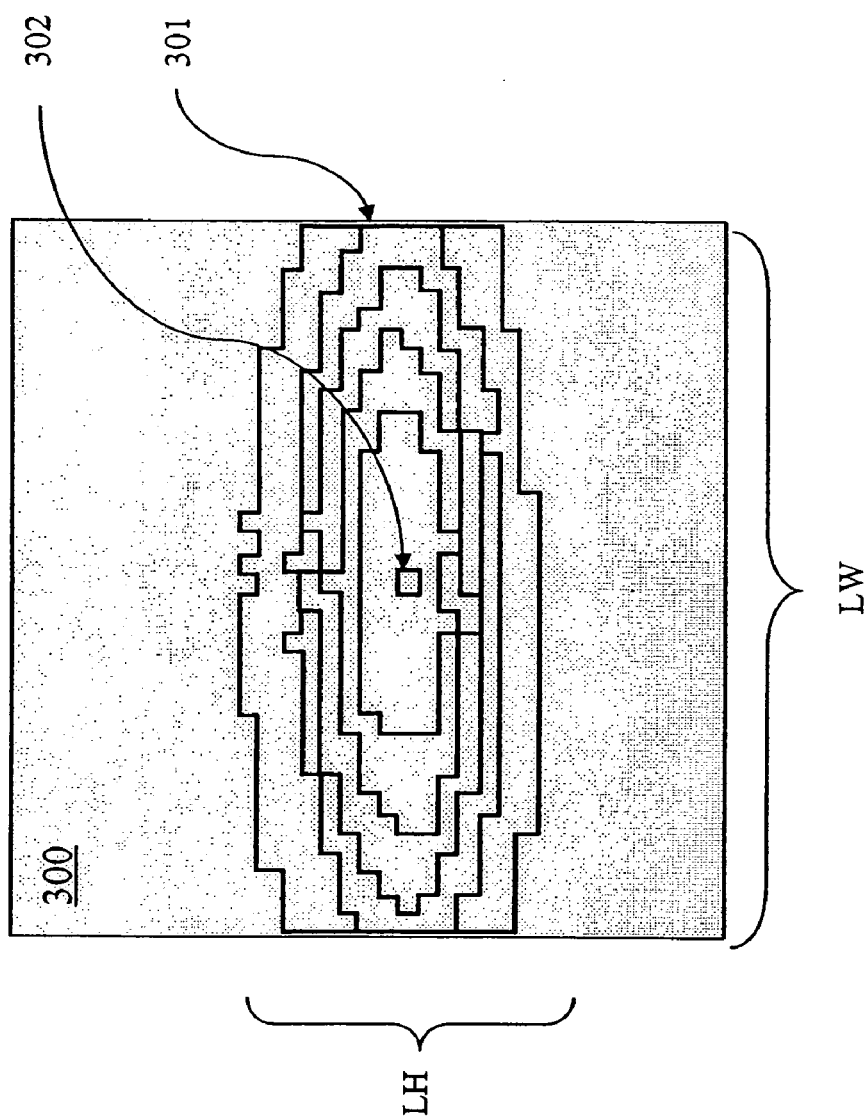
FIG. 3 is a front plan drawing of an exemplary laser diode output face, according to the prior art.

Referring now to the drawing, in which like reference numbers refer to like elements throughout the various figures that comprise the drawing, FIG. 2A shows an exemplary scan pattern of the present invention. The scan pattern is characterized by five data points comprising a center data point 20, and diamond vertex data points 21–24 disposed around the center data point 20. The vertex data points 21–24 may be disposed at the same distance from center data point 20, or from desirably varying distances from center data point 20 (not shown in FIG. 2A). As shown in prior art FIG. 3, for example, a laser diode output face 300 is characterized by light emitting region 301 having a height LH and a width LW, where the location of highest alignment quality is at center point 302. For such an output port, it may be desirable for the diamond scan pattern of FIG. 2A to have horizontal vertex data points 21 and 23 disposed at a greater distance from center data point 20 than vertical vertex data points 22 and 24 so as to substantially match the elliptical shape of light emitting region 301. Such an embodiment of the present invention is shown in FIG. 2B, where center data point 25 has vertex data points 26–29, and the distances from horizontal vertex data points 26 and 28 to center data point 25 are longer than the distances from vertical vertex data points 27 and 29 to center data point 25. An arrangement such as the one shown in FIG. 2B favors the elliptical shape of light emitting region 301—which is more sensitive in the vertical direction—and, therefore, may result in more efficient scanning of laser diode output face 300.

Figure 2C:
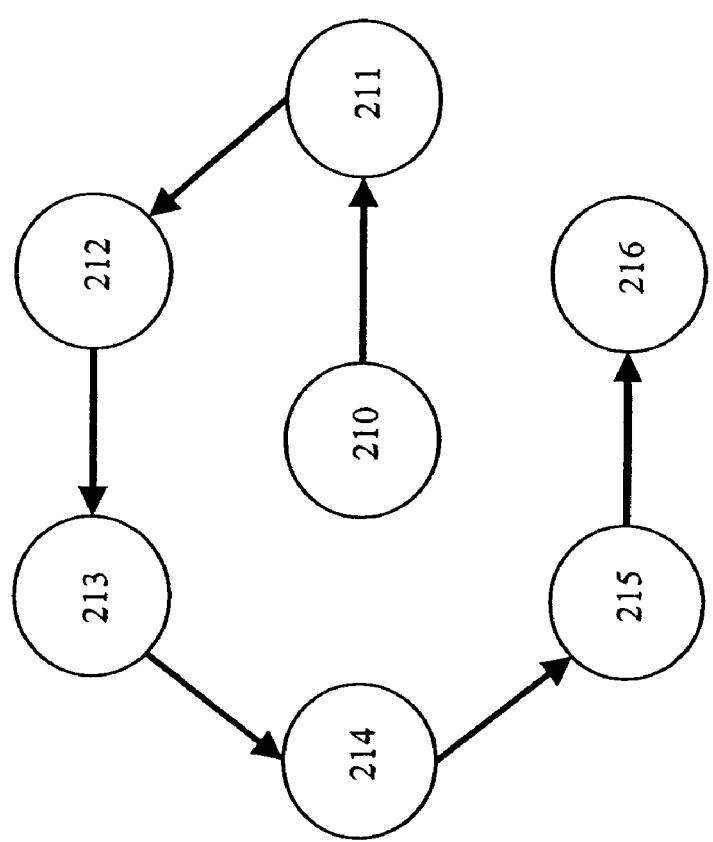
FIG. 2C is a plan view of a hexagonal 2D scan as characterized by its data points, according to the present invention.

Generally, a scan according to the present invention may obtain a measure of alignment quality at the center data point of the scan pattern and then proceed to take further measures at the vertex data points in either a clockwise or counter-clockwise progression. The first vertex data point at which a measure of alignment quality is made may be substantially to the right of the center data point, as shown in FIGS. 2A–C. Those skilled in the art will recognize, however, that the first vertex data point to be scanned may be selected according to many different schemes without departing from the invention.

Furthermore, those skilled in the art will recognize that a scan pattern of the present invention may generally be characterized by any planar geometric shape about the center data point. One alternate embodiment of the invention, for example, may comprise a hexagonal scan pattern as shown in FIG. 2C, where center data point 210 is surrounded by hexagonal vertex data points 211–216.

In the present invention, a method is presented for aligning an optical fiber to an optical output port having a face in order to achieve a desired alignment quality. Alignment quality may generally be expressed as a measure of optical coupling efficiency or an optical power reading. The optical output port may include any surface which may receive an optical signal or from which an optical signal may radiate, such as the output port of a single mode semiconductor laser, a multi-mode semiconductor laser, an optical mirror, a second optical fiber, a semiconductor optical amplifier, an optical concentrator, and a light-emitting diode. Further, the optical fiber may be one of a metallized or non-metallized wedge-lensed, ball, conical, and flat-cleaved fiber, or generally, any surface that may receive an optical signal.

Figure 4:
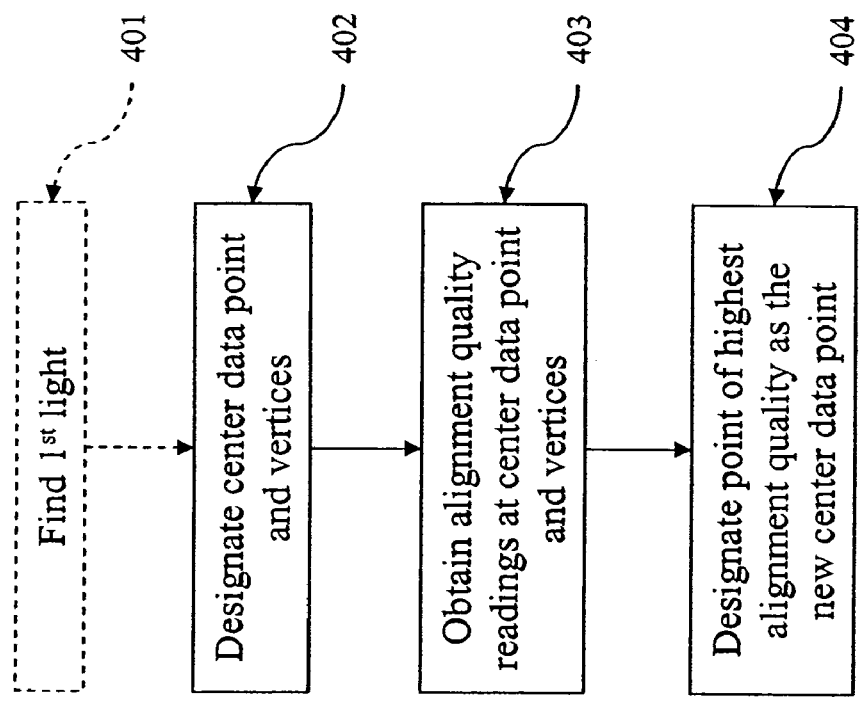
FIG. 4 is a flowchart illustrating an exemplary method of the scan procedure according to an embodiment of the present invention.

One exemplary embodiment of the present invention is illustrated in the flowchart of FIG. 4. In this embodiment, step 402 designates a center data point on the face of the optical output port. Step 402 also designates vertex data points as being disposed around the center data point in a predetermined pattern, such as one of the patterns of FIGS. 2A–C. In designating the location of a center data point, step 401 may be performed to find a first light signal on the face of the optical output port, whereby the location of the first light signal is designated as the location of the center data point in step 402. Alternately, either a random location or a predetermined location on the face of the optical output port may be used as the location of the center data point. Once the data points have been designated, step 403 proceeds to obtain respective measures of alignment quality at each of the center and vertex data points. As described above, the scan obtains a measure of alignment quality at the center data point and then obtains further measures of alignment quality at each of the vertex data points. In final step 404, the location of the data point having the highest alignment quality measured in step 403 is designated as the new center data point. The new center data point may then be used as a final point of alignment of the optical fiber to the optical output port. Alternately, the method may be iterated from step 402, with the new vertex data points being disposed around the new center data point.

Figure 5:
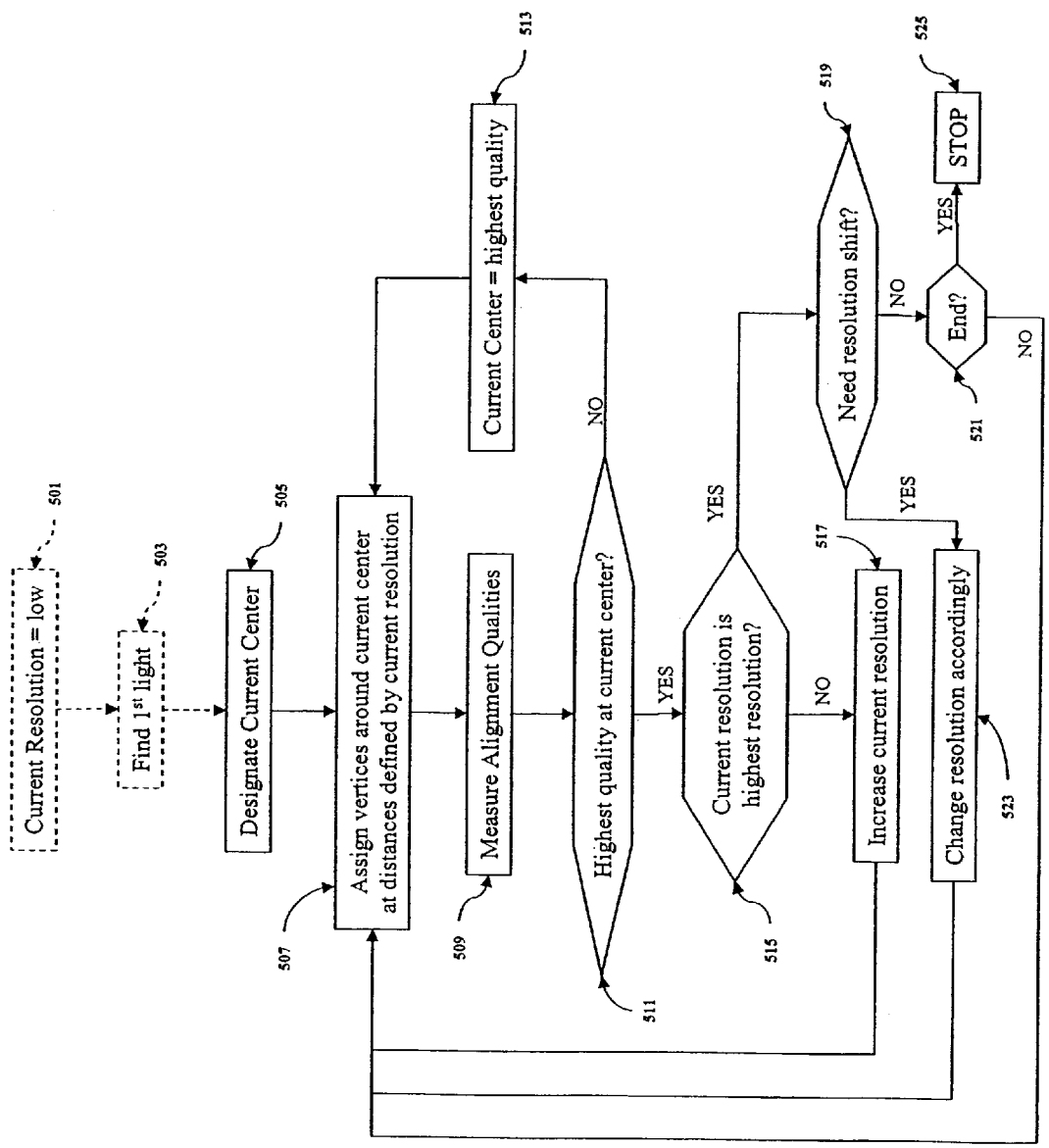
FIG. 5 is a flowchart illustrating a further exemplary method of the scan procedure, according to the present invention.

A further exemplary embodiment of the present invention, illustrated in FIG. 5, presents a method of aligning an optical input port to an optical output port to achieve substantially optimized initial coupling. The method begins at step 505 by designating a current center of the scan. The current center may be designated as the location of a first light signal found in step 503, or may generally be any predetermined or randomly selected point on the face of the optical output port.

Step 507 then proceeds to designate vertex data points around the current center at distances determined by a current resolution setting and at locations according to a predetermined scan pattern (such as one of the patterns in FIGS. 2A–C). The current resolution setting may take on a lowest value, a highest value, and one or more intermediate values. A setting of the current resolution, therefore, designates the respective distances of vertex data points from the center data point, whereby higher resolution values designate vertex data points at distances closer to the center data point. The current resolution setting may be initialized in step 501 to a lowest setting.

Step 509 then obtains measures of alignment quality at the center data point and each of the vertex data points to obtain five respective measures of alignment quality. In obtaining the measures of alignment quality, step 509 first obtains a measure at the center data point followed by a measure at a vertex data point located substantially to the right of the center data point and further measures at the remaining vertex data points in a clockwise or counterclockwise progression.

Step 511 then specifies the location of highest alignment quality among the five respective measures of alignment quality, and determines whether that location is at the center data point. If the highest alignment quality is not located at the center data point, then step 513 assigns a new center data point as being located at the location of highest alignment quality determined in step 511. The method then proceeds back to step 507, where the vertex data points are now disposed around the new center data point assigned in step 513. Step 509 then obtains a measure of alignment quality at the new center data point and then moves to the vertex data point that is in the same direction as the new center data point relative to the previous center data point. The scan generally proceeds in such an iterative fashion until step 511 determines the location of highest alignment quality among the five respective measures of alignment quality to be at the location of the center data point.

The method then proceeds to step 515, which determines whether the current resolution setting is at a highest value or not. If it is determined that the current resolution setting is not at a highest value in step 515, step 517 increases the current resolution setting from its present value to the next highest value. Steps 507–515 are then iterated until the current resolution setting is the highest resolution, whereby the method moves to step 519.

Step 519 determines whether a resolution shift is required according to predetermined criteria. The predetermined criteria for shifting the resolution may be illustrated by the state diagram of FIG. 6. Starting at lowest resolution setting 601, there are two transition paths that may be taken, non-transition 611 is taken if the new center $C_n$ is not at the same location as the previous center $C_{n-1}$, as previously described. If the new center $C_n$ is at the same location as the previous center $C_{n-1}$, low-to-mid1 transition 613 is taken from lowest resolution setting 601 to a first intermediate resolution setting 603. At first intermediate resolution setting 603, there are two transition paths that may be taken, non-transition 633 is taken if the new center $C_n$ is not at the same location as the previous center $C_{n-1}$, as previously described. If the new center $C_n$ is at the same location as the previous center $C_{n-1}$, mid1-to-high transition 637 is taken from first intermediate resolution setting 603 to a highest resolution setting 607. At highest resolution setting 607, there are three transition paths that may be taken, according to predetermined alignment quality threshold settings. Non-transition 677 is taken if the highest alignment quality measured Q falls within a highest threshold range $TR_{high}$; high-to-mid1 transition 673 is taken if the highest alignment quality measured Q falls within a first intermediate threshold range $TR_{m1}$; and high-to-low transition 671 is taken if the highest alignment quality measured Q falls within a lowest threshold range $TR_{low}$. Each threshold range generally corresponds to a respective resolution setting and is defined by an upper and lower threshold, where the upper threshold of a threshold range having a resolution setting coincides with the lower threshold of a threshold range having the next highest resolution setting.

Figure 6:
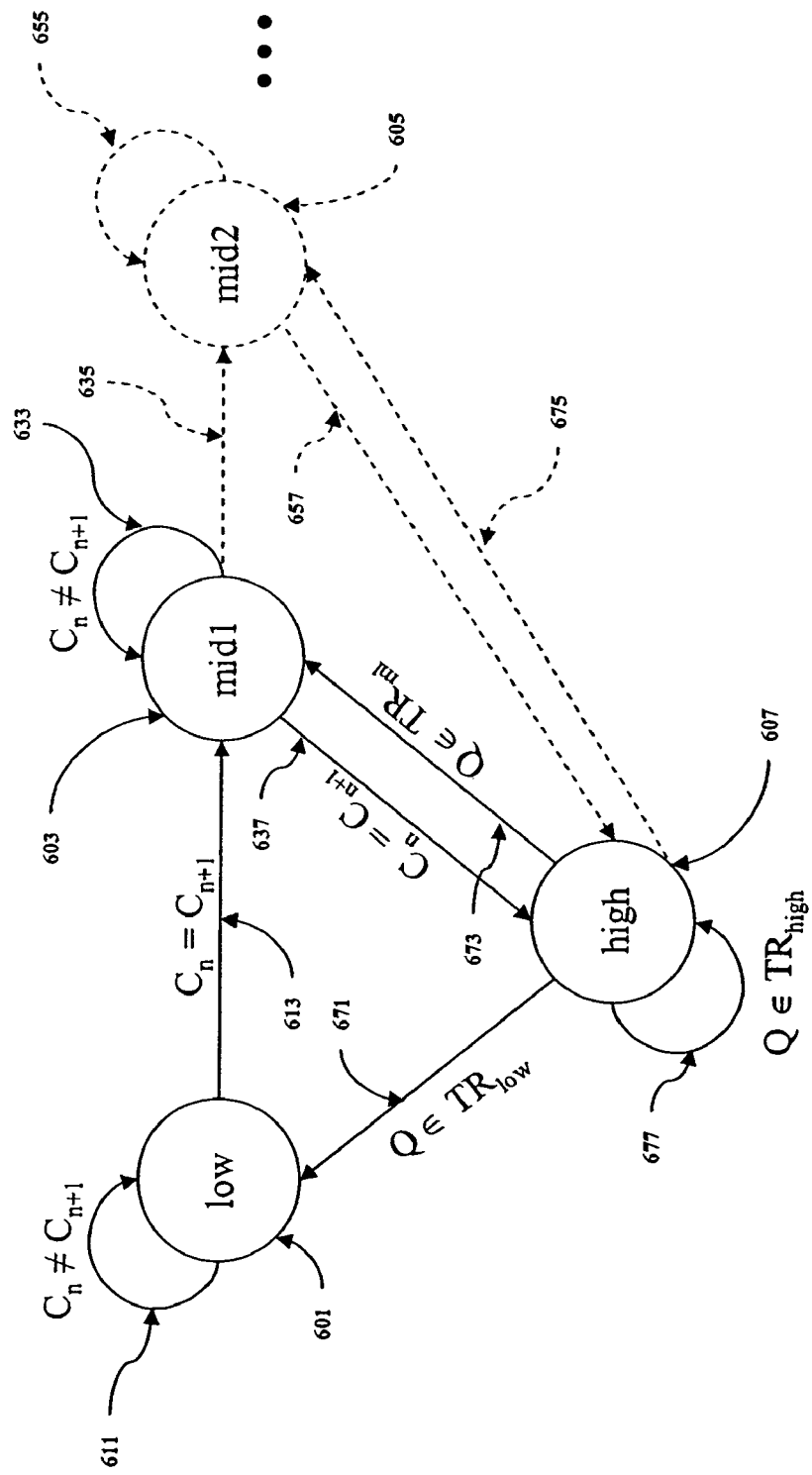
FIG. 6 is a state diagram illustrating resolution shifts in an exemplary method, according to the present invention.

It will be recognized by those skilled in the art that there may be any number of intermediate resolution settings. As shown in FIG. 6, for example, a second intermediate resolution setting 605 is shown in phantom. If second intermediate resolution setting 605 is implemented, then mid1-to-high transition 637 is removed. In such an alternate embodiment, mid1-to-mid2 transition 635 is initiated from first intermediate resolution setting 603 to second intermediate resolution setting 605 if the new center $C_n$ is not at the same location as the previous center $C_{n-1}$, as previously described. At the second intermediate resolution setting 605, non-transition 655 is taken if the new center $C_n$ is not at the same location as the previous center $C_{n-1}$, as previously described; and mid2-to-high transition 657 is taken if the new center $C_n$ is at the same location as the previous center $C_{n-1}$. At highest resolution setting 607, there are now four transition paths that may be taken, according to predetermined alignment quality threshold settings. Non-transition 677 is taken if the highest alignment quality measured Q falls within a highest threshold range $TR_{high}$; high-to-mid2 transition 675 is taken if the highest alignment quality measured Q falls within a second intermediate threshold range $TR_{m2}$; high-to-mid1 transition 673 is taken if the highest alignment quality measured Q falls within a first intermediate threshold range $TR_{m1}$; and high-to-low transition 671 is taken if the highest alignment quality measured Q falls within a lowest threshold range $TR_{low}$. In an alternate embodiment, there may be additional transition paths (not shown in FIG. 6) from intermediate resolution settings, if the highest alignment quality measure at each of the intermediate resolution settings falls within a respective threshold range of a lower resolution setting.

In one embodiment of the present invention, a highest threshold range may be, for example, characterized by a coupled optical power measure that is greater than or equal to 95% of a maximum power value; a first intermediate threshold range may be, for example, characterized by a coupled optical power measure that is greater than or equal to 60% of the maximum power value; and a lowest threshold range may be, for example, characterized by a coupled optical power measure that is greater than about 5% of the maximum power value. The maximum power value may be a predetermined value, or the maximum value of optically coupled power that is measured in any iteration of the scan according to the method shown in FIG. 5. In a further embodiment, a lowest resolution setting may be characterized by 700–800 nm step size (i.e., the distance between the center data point and any vertex data point); a first intermediate resolution setting may be characterized by 350–450 nm step size; and a highest resolution setting may be characterized by 80–150 nm step size. Alternately, a lowest resolution setting may be characterized by 5–7 micron horizontal step size and 700–800 nm vertical step size; a first intermediate resolution setting may be characterized by 1.5–2.5 micron horizontal step size and 350–450 nm vertical step size; and a highest resolution setting may be characterized by 250–350 nm horizontal step size and 80–150 nm vertical step size.

If it is determined in step 519 that a resolution shift is needed, as described above, then step 523 changes the resolution accordingly and begins the scan iteration again from step 507. If no resolution shift is needed, then a determination is made in step 521 whether to end the scan or to continue with further iterations from step 507. If the decision is made to end the scan, step 525 stops the process. If the decision is made to continue the scan, then the process continues with further iterations from step 507. In general, step 521 may set to "NO" until a manual input is provided indicating an end of the process.

Figure 7A:
FIG. 7A is plan view of the low resolution alignment of an optical fiber to an optical output port by an exemplary method, according to the present invention.
Figure 7B:
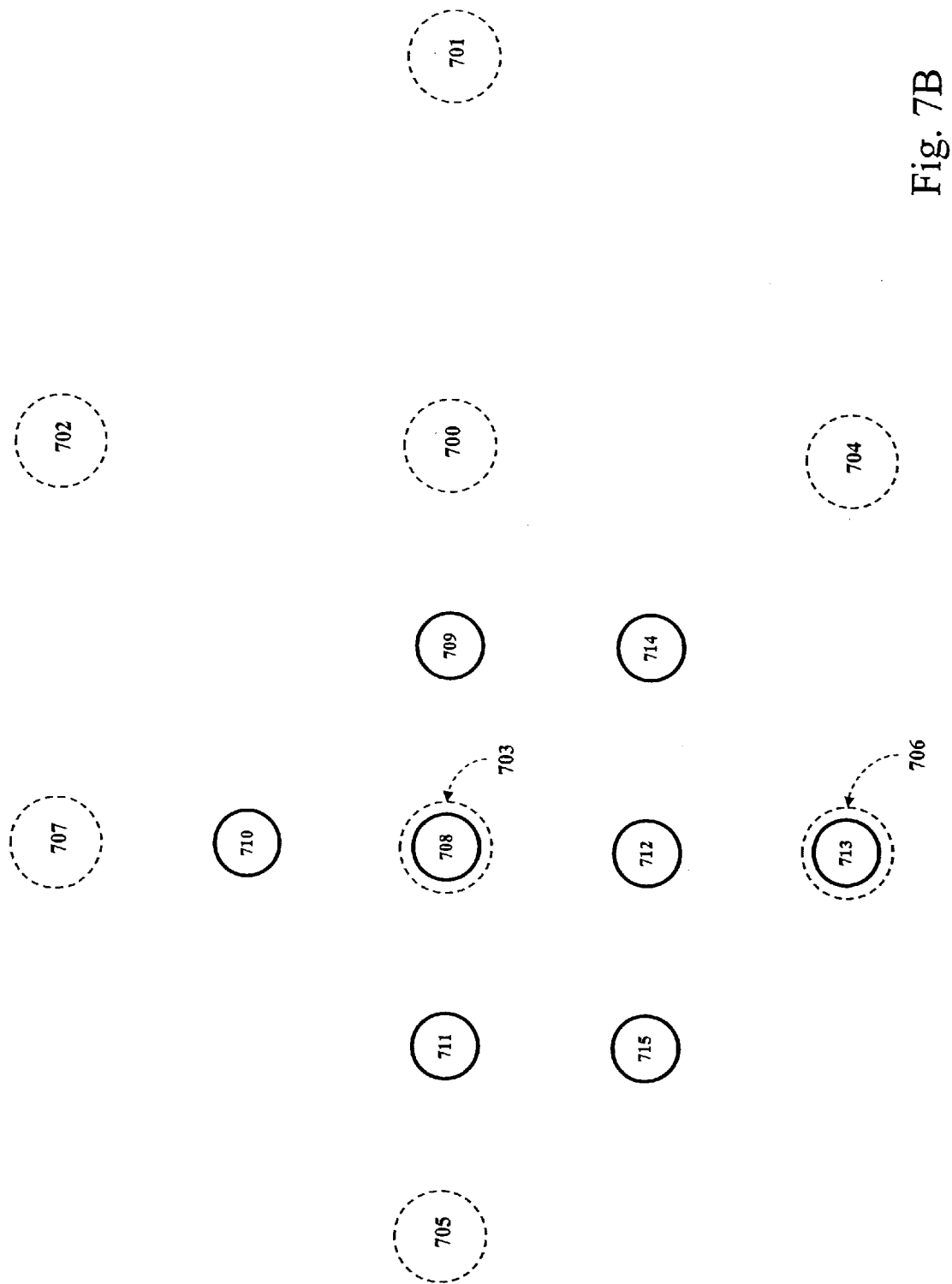
FIG. 7B is plan view of the medium resolution alignment of an optical fiber to an optical output port by an exemplary method, according to the present invention.
Figure 7C:
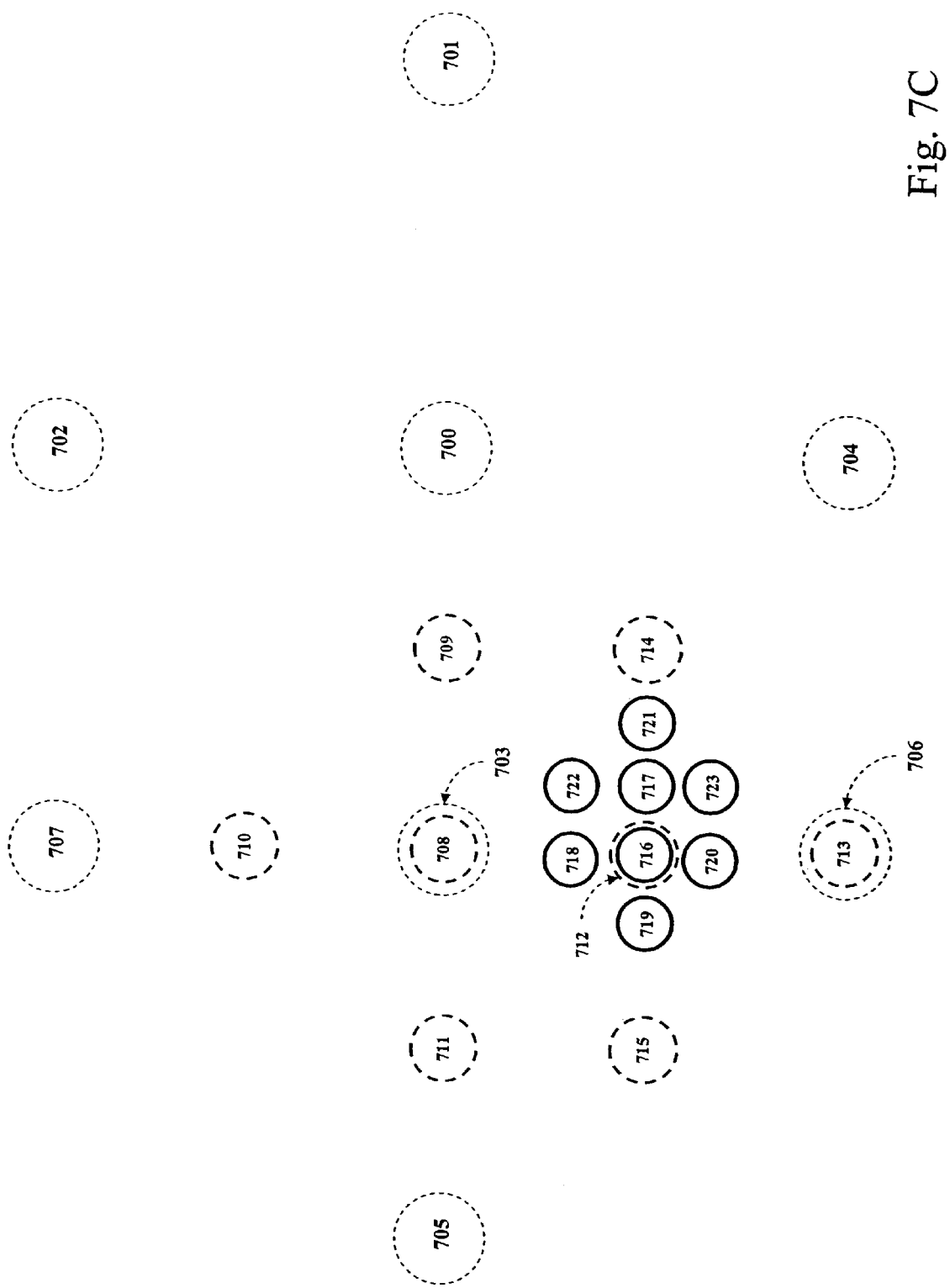
FIG. 7C is plan view of the high resolution alignment of an optical fiber to an optical output port by an exemplary method, according to the present invention.

FIGS. 7A–C illustrate an exemplary scan performed according to one embodiment of the present invention. FIG. 7A illustrates respective center and vertex data points 700–707 for a scan being performed at a lowest resolution setting. The scan initially designates data point 700 as the first center alignment point in the scan, whereby a measure of alignment quality is obtained at data point 700. The scan then proceeds to obtain further measures of alignment quality at data points 701, 702, 703, and 704, respectively. From the five respective measures of alignment quality, it is determined that data point 703 has the highest measure of alignment quality. Data point 703 is then designated as the new center alignment point, whereby a measure of alignment quality is obtained at data point 703. The scan then proceeds to obtain further measures of alignment quality at data points 705, 706, 700, and 707, respectively. From the current five respective measures of alignment quality, it is determined that data point 703 still has the highest measure of alignment quality. The scan, therefore, increases the current setting of resolution from the lowest setting to a first intermediate setting.

FIG. 7B illustrates respective center and vertex data points 708–715 for the continuation of the scan in FIG. 7A at the first intermediate resolution setting, with previous data points in phantom. The scan initially designates data point 708 as the first center alignment point in the scan, whereby a measure of alignment quality is obtained at data point 708. The scan then proceeds to obtain further measures of alignment quality at data points 709, 710, 711, and 712, respectively. From the five respective measures of alignment quality, it is determined that data point 712 has the highest measure of alignment quality. Data point 712 is then designated as the new center alignment point, whereby a measure of alignment quality is obtained at data point 712. The scan then proceeds to obtain further measures of alignment quality at data points 713, 714, 708, and 715, respectively. From the current five respective measures of alignment quality, it is determined that data point 712 still has the highest measure of alignment quality. The scan, therefore, increases the current setting of resolution from the lowest setting to a highest setting.

FIG. 7C illustrates respective center and vertex data points 716–723 for the continuation of the scan in FIG. 7B at the highest resolution setting, with previous data points in phantom. The scan initially designates data point 716 as the first center alignment point in the scan, whereby a measure of alignment quality is obtained at data point 716. The scan then proceeds to obtain further measures of alignment quality at data points 717, 718, 719, and 720, respectively. From the five respective measures of alignment quality, it is determined that data point 717 has the highest measure of alignment quality. Data point 717 is then designated as the new center alignment point, whereby a measure of alignment quality is obtained at data point 717. The scan then proceeds to obtain further measures of alignment quality at data points 721, 722, 716, and 723, respectively. From the current five respective measures of alignment quality, it is determined that data point 717 still has the highest measure of alignment quality. The scan may then designate the location of data point 717 as the point of desirable alignment.

Alternately, the system may continuously scan around data point 717 to move to a new center data point and/or initiate a change in the resolution setting, if necessary in order to account for thermal drift.

It can be seen that certain data points in a scan may be located off of the face of the optical output port. In one embodiment of the invention, such data points may generally be omitted from the scan, or may have their location adjusted so that they are on the face of the optical output port. Alternately, such a circumstance may cause a shift to higher resolution. Further, there may be two or more data points in a single scan iteration that have the same value of highest alignment quality. In one embodiment of the invention, the data point located in the direction of highest alignment quality from a previous scan iteration may be chosen as the location of the new center data point. Alternately, a random selection may be made designating one of the data points as the location of the new center data point.

It can be seen that measures of alignment quality are obtained twice for data points 700 and 703 at the lowest resolution setting, data points 708 and 712 at the first intermediate resolution setting, and data points 716 and 717 at the highest resolution setting. Furthermore, it can be seen that same resolution data redundancy, described above, coupled with cross-resolution data redundancy (e.g., data points 703 and 708 may generally be at the same location and may therefore have the same measure of alignment quality) in the present embodiment may generate 9 redundant measures of alignment quality. In an alternate embodiment of the invention, it may be desirable to remove such data redundancy by using alignment quality data already stored in memory for the location of a particular data point.

Once a desirable alignment has been achieved, the optical fiber is attached to a mount pad region using a heat sensitive attachment means (e.g. solder). It may be desirable to perform further adjustments of the optical fiber relative to the optical output port upon application of the heat sensitive attachment means to correct for thermal drift and misalignments induced by the application of the heat sensitive attachment means. Furthermore, it will be recognized by those skilled in the art that the alignment algorithm of the present invention may be applied to the alignment of an output port that is moved with respect to an input port as well as the alignment of an input port that is moved with respect to an output port, without departing from the invention.

Figure 8:
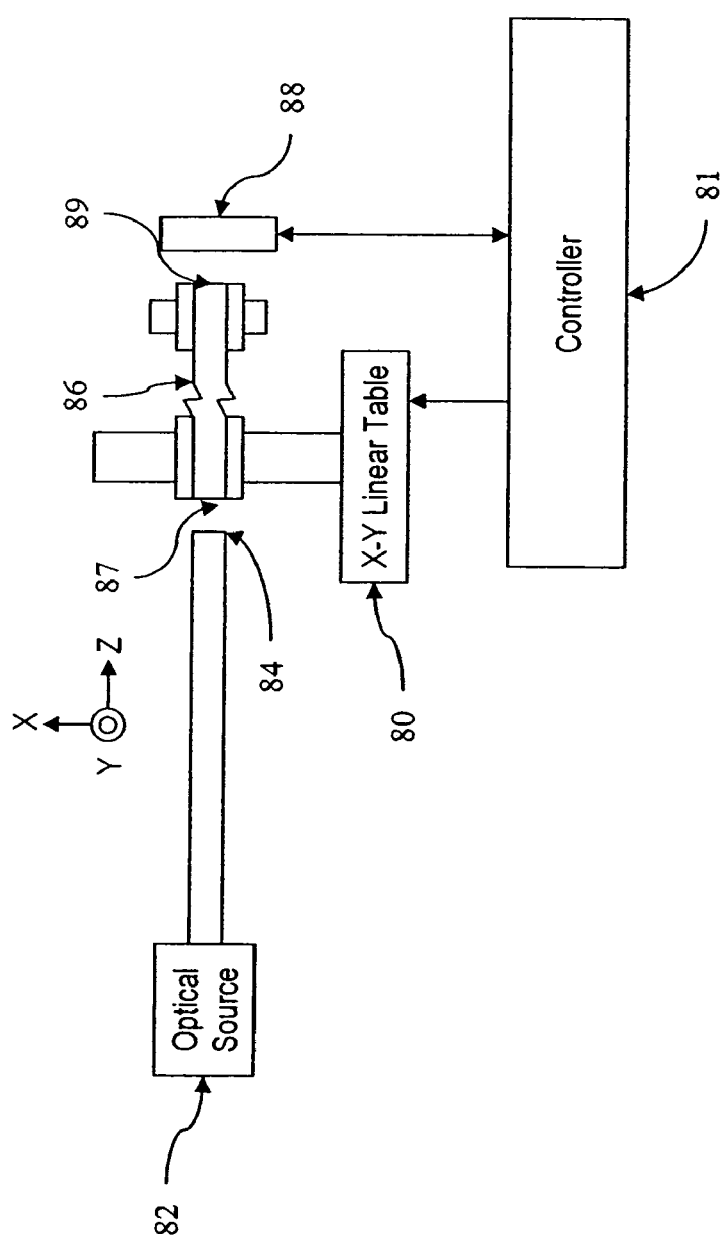
FIG. 8 is a block diagram of an embodiment of the present invention aligning an optical fiber to an optical source, according to the present invention.

FIG. 8 is a block diagram of one embodiment of the system. It shows an apparatus for aligning an optical input port 87 of optical fiber 86 with respect to an optical output port 84 of optical source 82. The apparatus comprises X-Y linear table 80 for movement of optical input port 87 with respect to optical output port 84 in the X- and Y-directions, or vice versa (not shown in FIG. 8), where the other end 89 of optical fiber 86 is held in place facing optical power meter 88, which obtains measures of alignment quality of optical input port 87 to optical output port 84 at one or more scan coordinates. The apparatus is further managed by controller 81, which directs movement of X-Y linear 80 table to one or more scan coordinates, compares measures of alignment quality received from the optical power meter at the one or more scan coordinates, initializes and changes scan resolution settings, and designates and updates the one or more scan coordinates according to the scan resolution setting and comparison of the measures of alignment quality. In a further embodiment, the apparatus may further comprise means for collecting and displaying measures of alignment quality, the scan resolution setting, and the one or more scan coordinates, wherein the controller may be manually operated. In another embodiment, the apparatus may also include memory (not shown) for storing measures of alignment quality at the one or more scan coordinates.

Although illustrated and described above with reference to certain specific embodiments, the present invention is nevertheless not intended to be limited to the details shown. Rather, various modifications may be made in the details within the scope and range of equivalents of the claims and without departing from the invention.

What is claimed:

1. An apparatus for aligning an optical input port having a face with respect to an optical output port having a face, the apparatus comprising:
    an X-Y linear table for moving one of the optical input port and optical output port with respect to the optical output port and optical input port, respectively;
    an optical power meter for obtaining measures of alignment quality of the optical input port to the optical output port;
    a memory for storing the measures of alignment quality and relative positions of the optical input port to the optical output port at which the respective measure of alignment quality are obtained; and
    a controller for:
        directing movement of the X-Y linear table according to a predetermined scan pattern, points in the predetermined scan pattern corresponding to the respective relative position,
        determining whether a measure of alignment quality for a current point in the predetermined scan pattern is stored in the memory,
        using the stored measure of alignment quality stored in memory when it is determined that the measure of alignment quality for the current point is stored and otherwise obtaining the measure of alignment quality for the current point from the optical power meter,
        comparing respective measures of alignment quality obtained from the optical power meter or from the memory at different relative positions of the optical input port and the optical output port,
        initializing and changing a scan resolution setting without changing the scan pattern, and
        designating and updating the respective relative positions of the optical input port and optical output port according to the scan resolution setting and comparison of the measures of alignment quality.

2. An apparatus according to claim 1, further comprising means for collecting and displaying measures of alignment quality, the scan resolution setting, and the respective relative positions of the optical input port and the optical output port, wherein the controller is a manually operated controller.

3. An apparatus according to claim 1, wherein the optical input port is an optical fiber and the optical output port is a semiconductor laser.

* * * * *